US012292332B2

(12) United States Patent
Martín Mateos et al.

(10) Patent No.: US 12,292,332 B2
(45) Date of Patent: May 6, 2025

(54) HYPERSPECTRAL IMAGE BASED ON DUAL-FREQUENCY COMB

(71) Applicant: UNIVERSIDAD CARLOS III DE MADRID, Leganés (ES)

(72) Inventors: Pedro Martín Mateos, Leganés (ES); Cristina De Dios Fernández, Leganés (ES); Óscar Elías Bonilla Manrique, Leganés (ES); Guillermo Andrés Guarnizo Herreño, Leganés (ES)

(73) Assignee: UNIVERSIDAD CARLOS III DE MADRID, Leganés (ES)

( * ) Notice: Subject to any disclaimer, the term of this patent is extended or adjusted under 35 U.S.C. 154(b) by 439 days.

(21) Appl. No.: 17/622,641

(22) PCT Filed: Jun. 19, 2020

(86) PCT No.: PCT/ES2020/070400
§ 371 (c)(1),
(2) Date: Jun. 24, 2022

(87) PCT Pub. No.: WO2020/260737
PCT Pub. Date: Dec. 30, 2020

(65) Prior Publication Data
US 2022/0364923 A1    Nov. 17, 2022

(30) Foreign Application Priority Data
Jun. 25, 2019    (ES) ............................... ES201930582

(51) Int. Cl.
*G01J 3/45* (2006.01)
*G01J 3/28* (2006.01)
*G01J 3/433* (2006.01)

(52) U.S. Cl.
CPC ............... *G01J 3/45* (2013.01); *G01J 3/2823* (2013.01); *G01J 3/4338* (2013.01)

(58) Field of Classification Search
CPC .......... G01J 3/45; G01J 3/2823; G01J 3/4338; G02F 1/11
See application file for complete search history.

(56) References Cited

U.S. PATENT DOCUMENTS

| 4,256,362 A * | 3/1981 | Bardos | ..................... G03H 1/22 359/33 |
| 2001/0045513 A1 * | 11/2001 | Kourogi | ............. G01B 9/02002 250/250 |

(Continued)

OTHER PUBLICATIONS

O. E. Bonilla-Manrique, P. Martín-Mateos, B. Jerez, M. Ruiz-Llata and P. Acedo, "High-Resolution Optical Thickness Measurement Based on Electro-Optic Dual-Optical Frequency Comb Sources," in IEEE Journal of Selected Topics in Quantum Electronics, vol. 23, No. 2, pp. 140-146, Mar.-Apr. 2017 (Year: 2017).*

(Continued)

*Primary Examiner* — Michael J Logie
*Assistant Examiner* — Adrian Ignacio Silva
(74) *Attorney, Agent, or Firm* — Holzer Patel Drennan

(57) ABSTRACT

A method for generating a illumination dual-comb signal that provides a low frequency train of interferograms (180) readable by a regular video-rate camera (160) comprising N pixels and a sampling frequency of V Hz to extract hyper-spectral information (170), the method comprising providing a monochromatic signal, splitting the monochromatic signal in two split monochromatic signals, frequency shifting each monochromatic signal with an offset frequency below $$\frac{V}{2} \text{ Hz},$$

(Continued)

generating two frequency combs having a difference in repetition below $$\frac{V}{2} \text{ Hz}$$

by a nonlinear modulation of the two split monochromatic signals, generate the illumination dual-comb signal, Illuminating a target and employing a video-rate camera (160) to read a low frequency train of interferograms (180) based on a reflected and/or transmitted signal of the illumination dual-comb signal and performing Fourier transformation of the low frequency train of interferograms (180) detected by each pixel from the N pixels to extract the hyperspectral information (170).

4 Claims, 2 Drawing Sheets

(56) References Cited

U.S. PATENT DOCUMENTS

| | | | |
|---|---|---|---|
| 2013/0293946 A1 | 11/2013 | Fermann et al. | |
| 2017/0059408 A1* | 3/2017 | Körner | G01J 3/0229 |
| 2018/0136016 A1* | 5/2018 | Yaman | G01M 11/3118 |
| 2018/0309941 A1 | 10/2018 | Lopez et al. | |
| 2021/0356839 A1* | 11/2021 | Ansari | H03H 9/174 |

OTHER PUBLICATIONS

Search Report completed Sep. 28, 2020 for International Application No. PCT/ES2020/070400.

Bonilla-Manrique, Oscar, "High-Resolution Optical 5 Thickness Measurement Based on Electro-Optic Dual-Optical Frequency Comb Sources", IEEE Journal of Selected Topics in Quantum Electronics, Dec. 10, 2016, 1-7.

Jerez, Borja, "Dual optical frequency comb architecture with capabilities from visible to mid-infrared", Optics Express, Jun. 23, 2016, 14986-14994.

Martin-Mateos, Pedro, "Dual electro-optic optical frequency combs for multiheterodyne molecular dispersion spectroscopy", Optics Express, Aug. 4, 2015, 21149-21158.

* cited by examiner

HYPERSPECTRAL IMAGE BASED ON DUAL-FREQUENCY COMB

OBJECT OF THE INVENTION

The present invention refers to methods and systems for enabling hyperspectral dual-comb imaging.

Particularly, the object of the present invention is to provide a method to extract hyperspectral images using an illumination dual optical frequency comb signal and a regular video-rate camera.

BACKGROUND OF THE INVENTION

Hyperspectral cameras provide images with a combination of spatial and spectral information. This technology has found numerous applications on fields such as food analysis, agriculture, geology and chemical imaging, leading to important scientific discoveries, and has a market size that is expected to reach 21.33 billion by 2023. In recent years, different groups have successfully tried to take advantage of dual optical frequency comb sources for boosting different aspects of the performance of current hyperspectral imagers. Mainly two distinct approaches have been put into practice: a single point measurement system together with a raster scans across the sample using a motorized platform and a single-pixel-imager based on spatial light modulation. Nevertheless, none of the two methods has proven to be particularly successful due to significant limitations.

Hence, it is desired a method and system to produce hyperspectral dual-comb images that solves the limitations of the aforementioned approaches.

DESCRIPTION OF THE INVENTION

The present invention proposes a new hyperspectral imaging approach based on a dual-comb source that is capable of generating optical pulses that are so closely matched that interfere at a rate that is slow enough to be detected by a regular video rate camera, enabling true scan-less hyperspectral dual-comb imaging with unprecedented performance.

Hence, a first aspect of the present invention is a method for generating a illumination dual-comb signal that provides a low frequency train of interferograms readable by a regular video-rate camera having a sampling frequency of V Hz and N pixels to extract hyperspectral information, the method comprises a first step for providing a monochromatic signal, a second step for splitting the monochromatic signal in two split monochromatic signals, a third step for frequency shifting each signal with an offset frequency below $$\frac{V}{2} \text{ Hz,}$$

a fourth step for generating two frequency combs having a difference in repetition below $$\frac{V}{2} \text{ Hz}$$

by a nonlinear modulation of the two split monochromatic signals, a fifth step for combining the two generated frequency comb signals to generate the illumination dual-comb signal, a sixth step for Illuminating a target with the illumination dual-comb signal and a seventh step for employing a video-rate camera to read a low frequency train of interferograms based on a reflected and/or transmitted signal of the original illumination dual-comb signal. Finally, a Fourier transformation of the train of interferograms detected at each individual pixel of the N pixels of the camera provides the desired hyperspectral information.

In a second aspect of the present invention it is proposed a system for generating a dual-comb signal that provides a low frequency train of interferograms readable by a regular video-rate camera. The system comprises a laser providing a monochromatic signal, a first splitter to split the monochromatic signal into two split signals, a first acousto-optic modulator and a first phase/intensity modulator to perform a frequency shift and the nonlinear modulation of a first split signal, a second acousto-optic modulator and a second phase modulator to perform a frequency shift and the nonlinear modulation of a second split signal and a second splitter to combine the first and second modulated split signals to obtain the dual-comb signal.

BRIEF DESCRIPTION OF THE DRAWINGS

For a better understanding the above explanation and for the sole purpose of providing an example, some non-limiting drawings are included that schematically depict a practical embodiment.

DESCRIPTION OF A PREFERRED EMBODIMENT

Figure 1:
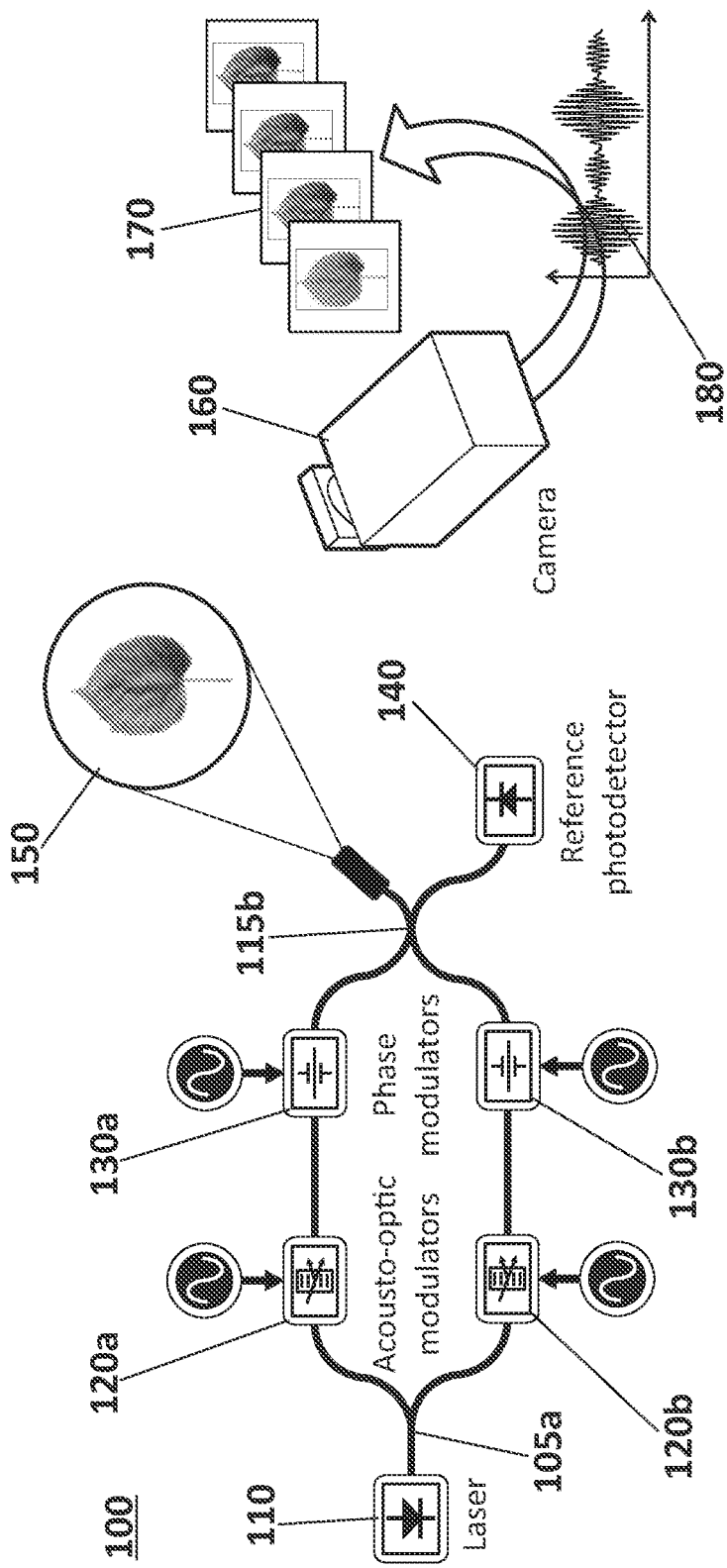
FIG. 1 shows an example dual-comb generation system according to the present invention.

FIG. 1 shows a block diagram of an example dual-comb generation system (100) according to the present invention. The dual-comb generation system (100) can generate an illumination dual-comb signal that provides a low frequency train of interferograms (180) readable by a regular video-rate camera (160) in order to extract hyperspectral information (170).

An architecture based on a dual electro-optic comb source (in which two acousto-optic modulators have been included) is disclosed. Electro-optic dual-combs feature a simple set-up and an inherently very high mutual coherence between combs that can be further enhanced (e.g. the obtained dual combs can comprise beat note linewidths of a few mHz) using uncomplicated feedback loops.

Furthermore, a 1550 nm laser diode (110) driven by a low noise current source is used as monochromatic source.

The signal from the laser diode (110) can be split in two split signals at location (105a) and injected in parallel into two 40 MHz acousto-optic modulators (120a, 120b) that perform frequency shifting for each split signal (e.g., at 40 MHz) with an offset frequency of a few Hz (e.g., 5 Hz) and from which the comb signals can be generated. Other shifting frequencies for the acousto-optic modulators (120a, 120b) can be used. In general, the frequency shifting is performed for each signal with, for example, an offset frequency below $$\frac{V}{2} \text{ Hz,}$$

where v is the sampling frequency of the camera (160) in frames per second.

Furthermore, the dual-comb generation system (100) comprises two low $V_\pi$ phase modulators (130a, 130b) that perform nonlinear modulation to generate two frequency combs having a difference in repetition frequency below $$\frac{V}{2} \text{ Hz}$$

(e.g. 1 Hz). A second optical splitter at point (115b) recombines the two optical comb signals to generate the dual-comb signal. Additionally, a reference for wavelength and comb generation monitoring can be extracted with photodetector (140) for monitoring purposes.

Furthermore, the dual-comb signal can be employed to illuminate a target (150) and a low frequency train of interferograms (180) can be read by a regular video camera (160). The pixel by pixel Fourier transformation of the intensity recorded by each pixel of the sensor yields the spectrum detected at each pixel of the N pixels of the camera (160). Additionally, the generated dual-comb signal can be shifted to the visible, the mid-IR or the terahertz frequencies to extend the operation range of the method.

Figures 2A, 2B:
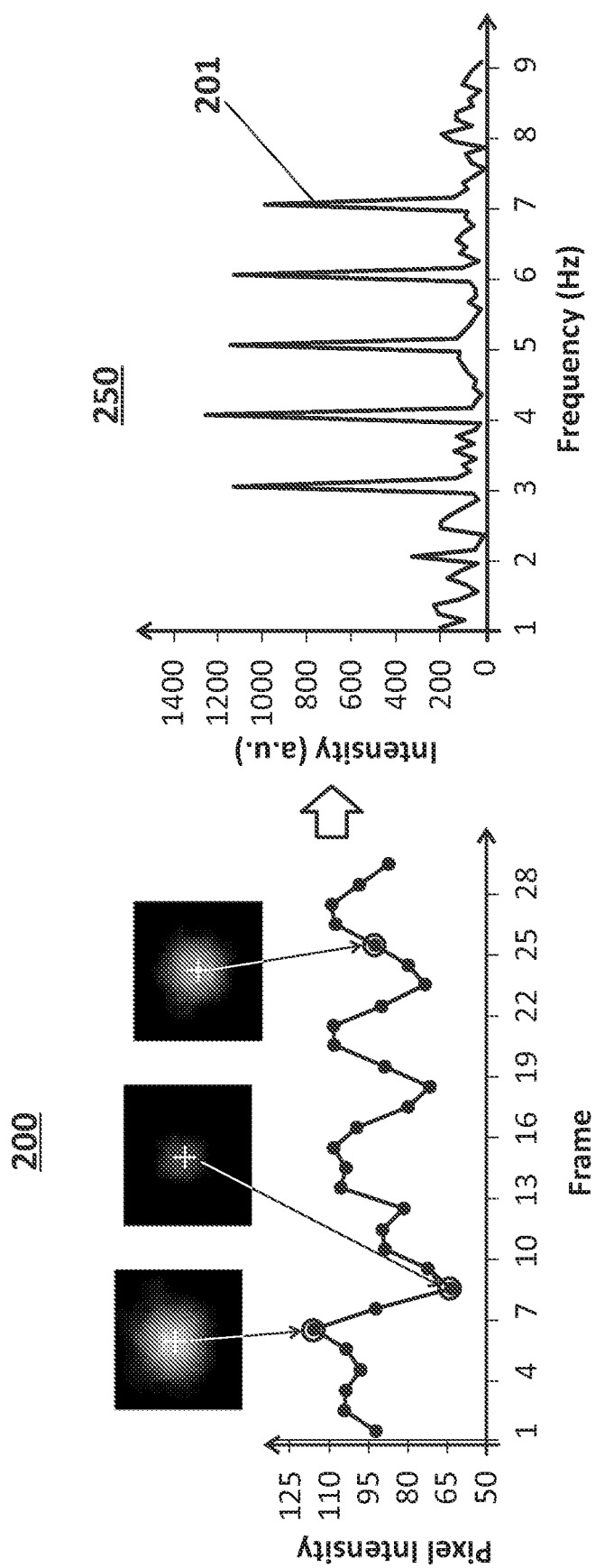
FIGS. 2A and 2B shows results of an experimental demonstration to generate an illumination dual-comb signal with the dual-comb generation system according to the present invention.

FIGS. 2A and 2B shows an experimental demonstration in which the system (100) was configured with an offset frequency between the two frequency comb signals of 5 Hz (frequency shifted 40.000005 MHz and 40 MHz in the acousto-optic modulators) and a difference in repetition frequencies of 1 Hz (1.000000001 GHz and 1 GHz signals driving the phase modulators for an optical resolution of 8 pm/0.033 cm$^{-1}$). In general, the teeth spacing can be adjusted from a few tens of MHz to tens of GHz generating hundreds of lines with an adequately high level of RF power delivered to the phase/intensity modulators. Nonetheless, during this experimental demonstration shown in FIGS. 2A and 2B the power levels of the driving signals in the system (100) were kept low to ensure a reduced number of teeth. The camera (160) can operate at a frame rate of roughly 30 frames per second.

FIG. 2 shows the results of an experiment in which a collimated dual-comb beam is focused into the camera. The low frequency interference between combs modulates the optical intensity read by each pixel as shown in the interferogram signal (200) in FIG. 2A and hence, enabling direct interferogram digitization. The Fourier transformation of the acquired signal yields the comb structure (250) (as shown in FIG. 2B), in which individual comb lines (201) of a total of 5 comb lines can be clearly resolved.

Hence, the dual-comb source generated by the proposed system (100) is capable of transforming a regular video-rate camera into an ultra-high resolution hyperspectral imager to provide both spectral and spatial information. The use of an electro-optic dual-comb source has facilitated the generation of two combs with offset frequencies well below the frame rate of a common camera, giving rise to very low-frequency interferograms that can be straightforwardly measured by all the pixels of the camera sensor simultaneously (the number of spectral bands, or comb teeth, N is only restricted in practice by the camera frame rate and the integration time employed and could reach several hundreds of lines in other examples).

Hence, the present invention enables hyperspectral imaging to take full advantage of the characteristics of dual-comb spectroscopy, providing features never demonstrated before and opening new ways for high-precision remote sensing. Besides this, the spectral range of the comb source can be uncomplicatedly shifted to shorter or mid-IR frequencies by non-linear processes, which widens the range of applications of the method. Especially noteworthy are the prospects opened in the THz range, to which electro-optic combs can be easily shifted, providing a much wider relative span (octave spanning).

Even though reference has been made to a specific embodiment of the invention, it is obvious for a person skilled in the art that the system and method described herein are susceptible to numerous variations and modifications, and that all the details mentioned can be substituted for other technically equivalent ones without departing from the scope of protection defined by the attached claims.

The invention claimed is:

1. A method for generating an illumination dual-comb signal that provides a train of interferograms readable by a regular video-rate camera comprising N pixels and having a sampling frequency of V Hz to extract hyperspectral information, the method comprising:
   providing a monochromatic signal;
   splitting the monochromatic signal in two split monochromatic signals;
   independently frequency shifting each of the two split monochromatic signals with an offset frequency below $$\frac{V}{2} \text{ Hz;}$$

generating two frequency combs having a difference in repetition frequencies below $$\frac{V}{2} \text{ Hz}$$

by independent nonlinear modulation of the two split monochromatic signals;
   combining the two generated frequency comb signals to generate the illumination dual-comb signal;
   illuminating a target with the illumination dual-comb signal;
   employing a video-rate camera to read a train of interferograms based on one or both of a reflected and a transmitted signal of the illumination dual-comb signal at a frequency below $$\frac{V}{2}$$

Hz; and
   performing Fourier transformation of the train of interferograms detected by each pixel from the N pixels to extract the hyperspectral information.

2. The method of claim 1, further comprising:
   shifting the illumination dual-comb signal to wavelength ranges including visible, mid-IR and Terahertz ranges.

3. The method of claim 1, wherein performing frequency shifting comprises shifting each signal at 40 MHz having a frequency offset of 5 Hz.

4. The method of claim 1, wherein performing nonlinear modulation comprises using a single intensity or phase modulator or an arrangement of intensity or phase modulators.

* * * * *